(12) United States Patent
Sobb

(10) Patent No.: US 9,345,343 B2
(45) Date of Patent: May 24, 2016

(54) REMOVABLE HANGING DEVICE

(71) Applicant: Robert A. Sobb, Jackson, MI (US)

(72) Inventor: Robert A. Sobb, Jackson, MI (US)

( * ) Notice: Subject to any disclaimer, the term of this patent is extended or adjusted under 35 U.S.C. 154(b) by 52 days.

(21) Appl. No.: 14/183,895

(22) Filed: Feb. 19, 2014

(65) Prior Publication Data

US 2014/0231606 A1     Aug. 21, 2014

Related U.S. Application Data

(60) Provisional application No. 61/766,746, filed on Feb. 20, 2013.

(51) Int. Cl.
| A47F 5/08 | (2006.01) |
| A47G 7/04 | (2006.01) |
| A63B 71/00 | (2006.01) |
| F16M 13/02 | (2006.01) |
| E04H 17/06 | (2006.01) |

(52) U.S. Cl.
CPC ............... *A47F 5/0823* (2013.01); *A47F 5/083* (2013.01); *A47F 5/0815* (2013.01); *A47G 7/044* (2013.01); *A47G 7/045* (2013.01); *A63B 71/0045* (2013.01); *E04H 17/06* (2013.01); *F16M 13/022* (2013.01)

(58) Field of Classification Search
CPC ... A47G 7/045; A47G 7/044; A63B 71/0045; A47F 5/083; A47F 5/0815; A47F 5/0823; F16M 13/022
USPC .................................................... 248/220.31
See application file for complete search history.

(56) References Cited

U.S. PATENT DOCUMENTS

| 2,565,055 | A | * | 8/1951 | White .......................... 248/27.8 |
| 3,443,783 | A | * | 5/1969 | Fisher ..................... F16B 19/00 |
| | | | | 248/222.52 |
| 3,880,390 | A | * | 4/1975 | Niven .................... A47F 5/0815 |
| | | | | 248/220.43 |
| 4,340,144 | A | | 7/1982 | Cousins |
| D266,382 | S | * | 10/1982 | Hutchinson .................... D6/556 |
| 4,434,960 | A | * | 3/1984 | Berry ..................... A47F 5/0815 |
| | | | | 248/220.43 |
| 4,499,688 | A | * | 2/1985 | Droll ................................ 47/83 |

(Continued)

FOREIGN PATENT DOCUMENTS

| DE | 29704787 U1 | * | 5/1997 | |
| GB | 2249020 A | * | 4/1992 | ............. A47B 96/06 |

(Continued)

*Primary Examiner* — Terrell McKinnon
*Assistant Examiner* — Eret McNichols
(74) *Attorney, Agent, or Firm* — Fraser Clemens Martin & Miller LLC; James D. Miller

(57) ABSTRACT

A removable hanging device configured to be retained within one of a lattice fence and a chain-link fence is disclosed, wherein the hanging device includes a retaining element having a substantially square cross-section configured to be received in a square opening formed in a fence, a hanger body configured to allow an article to be supported thereby, and a shaft connecting the retaining element to the hanger body. The retaining element is aligned with and extended through the square opening of the fence prior to being rotated to orient a top surface of the hanger body parallel to a ground surface. The rotation of the hanging device causes the retaining element to be oriented at 45° with respect to the square opening, causing the retaining element to be secured within the fence as the retaining element is unable to be removed from the square opening without first rotating the hanging device.

8 Claims, 4 Drawing Sheets

(56) References Cited

U.S. PATENT DOCUMENTS

| | | | |
|---|---|---|---|
| 4,582,284 A | 4/1986 | Veenstra | |
| 4,805,784 A * | 2/1989 | Solheim et al. | 211/94.01 |
| 4,860,905 A * | 8/1989 | Schott et al. | 211/59.1 |
| 4,953,817 A | 9/1990 | Mosteller | |
| 5,364,050 A | 11/1994 | Smith | |
| 5,441,239 A | 8/1995 | Watson | |
| 5,457,911 A * | 10/1995 | Vollink | 47/67 |
| 6,592,102 B2 | 7/2003 | Telles | |
| 6,659,412 B1 | 12/2003 | Roach | |
| 6,935,518 B2 * | 8/2005 | Winig et al. | 211/90.02 |
| 6,945,414 B1 * | 9/2005 | Stevens et al. | 211/94.01 |
| D579,705 S * | 11/2008 | Winig et al. | D6/567 |
| 7,523,899 B2 | 4/2009 | Cormier | |
| 8,061,671 B2 * | 11/2011 | Mahaffy | 248/311.2 |
| 8,123,185 B2 * | 2/2012 | Winig et al. | 248/250 |
| 8,166,921 B2 * | 5/2012 | Biggs | 119/246 |
| 8,235,223 B2 * | 8/2012 | Winig et al. | 211/7 |
| 8,459,472 B2 * | 6/2013 | Hofman | A47F 5/0815 |
| | | | 211/106.01 |
| 8,523,127 B1 | 9/2013 | Bennett | |
| 8,616,385 B1 * | 12/2013 | Doran | 211/85.7 |
| 8,777,020 B2 * | 7/2014 | Winig et al. | 211/85.1 |
| 8,899,424 B2 * | 12/2014 | Bayazit et al. | 211/26 |
| 2005/0194335 A1 * | 9/2005 | Hibner | 211/85.7 |
| 2007/0090067 A1 * | 4/2007 | Holztrager | 211/59.1 |
| 2007/0210228 A1 * | 9/2007 | Brenner et al. | 248/311.2 |
| 2007/0215768 A1 * | 9/2007 | Winig et al. | 248/220.22 |
| 2008/0245937 A1 * | 10/2008 | Connor | 248/215 |
| 2009/0134376 A1 | 5/2009 | Garceau et al. | |
| 2011/0100939 A1 | 5/2011 | Friesch | |
| 2011/0174945 A1 * | 7/2011 | Wood | 248/225.11 |
| 2014/0061401 A1 * | 3/2014 | Bernstein | 248/125.3 |
| 2014/0250673 A1 * | 9/2014 | White | 29/525.08 |

FOREIGN PATENT DOCUMENTS

| | | |
|---|---|---|
| WO | WO 9525902 A1 * | 9/1995 |
| WO | WO 2009073990 A1 * | 6/2009 |

* cited by examiner

REMOVABLE HANGING DEVICE

CROSS-REFERENCE TO RELATED APPLICATIONS

This application claims priority to U.S. Provisional Application Ser. No. 61/766,746, filed Feb. 20, 2013, the entire disclosure of which is hereby incorporated herein by reference.

FIELD OF THE INVENTION

The present invention generally relates to a device for hanging various articles for outdoor use, such as gardening tools, shovels, signage, and ladders, from a support structure. More particularly, the current invention relates to a hanger, hook, or anchor configured to be retained in a lattice or chain-link fence.

BACKGROUND OF THE INVENTION

There are numerous situations where a person may desire to store an article outside of the person's home such as in a garage or shed. Such outdoor storage areas are particularly desirable when the person wishes to store articles for outdoor use that tend to become dirty by the very nature of their use such as shovels and extension ladders. Unfortunately, many homes are not equipped with such outdoor storage areas and building the storage areas can be time consuming, costly, and in some cases, inappropriate due to zoning restrictions.

Additionally, many outdoor activities and projects, such as gardening and landscaping, may require that numerous different articles be utilized. This often requires the person to make numerous trips back and forth between a project site and the location in which the numerous articles are typically stored. These back and forth trips are not only cumbersome and time consuming, but they also tend to facilitate the misplacement of some articles, as the person attempting the project may find that it is difficult to organize the many articles when they are present at the project site.

One solution to these problems is to have a removable hanger or hook that is adapted for use with a common outdoor feature of many homes such as a fence. Such removable hangers can be used both for permanent storage and for temporary organizational purposes, for instance, hanging numerous tools close to a project site for easy, quick, and reliable access to the desired tool at the desired time.

A common problem among the current removable hanging devices that are adapted to be supported by a fence is that they often consist of numerous different parts that in many cases are formed from different materials. These complicated hanging devices are not only more difficult to manufacture, but they may also be confusing for a user to properly hang or install the device.

Another common problem is that many of the current hanging devices are configured to be retained only in a chain-link fence, ignoring many other common types of fencing such as lattice fencing. Lattice fencing is especially preferred in certain applications because it has a decorative appearance, especially when painted or finished, and offers an added level of privacy over traditional metallic chain-link fencing. Lattice fencing is also commonly used to accentuate landscaping features or to encompass decorative gardens. This close proximity of lattice fencing to landscaping features facilitates the need for a device that can easily store or temporarily organize the articles commonly associated with maintaining such landscaping features.

It would therefore be desirable to have a removable hanging device that is adapted for easy installation in and removal from any type of support structure having at least one square opening formed therein.

SUMMARY OF THE INVENTION

In accordance with the present invention, a removable hanging device that allows for easy installation and removal from an opening in a support structure has surprisingly been discovered.

In an embodiment of the current invention, a removable hanging device for use with a structure having at least one square opening formed therein is disclosed. The removable hanging device comprises a retaining element configured to be received in the at least one square opening of the structure, the retaining element including a substantially square rear face. The removable hanging device also comprises a hanger body configured to support an article therefrom and a shaft connecting the retaining element to the hanger body. An axis of the shaft extends from the hanger body to the retaining element and through a center of the shaft.

In another embodiment of the invention, a removable hanging device for use with a structure having at least one square opening formed therein is disclosed. The removable hanging device comprises a retaining element configured to be received in the at least one square opening of the structure, the retaining element including a substantially square cross-section as the retaining element extends from a rear face thereof to a front face thereof. The removable hanging device further comprises a hanger body including a rear face, and a shaft connecting the front face of the retaining element to the rear face of the hanger body, wherein the shaft has a substantially rectangular cross-section as the shaft extends from the front face of the retaining element to the rear face of the hanger body, the shaft including a channel formed therein extending from a first side surface of the shaft to a second side surface of the shaft and formed adjacent to a third side surface and a fourth side surface of the shaft causing the shaft to include a first portion between the channel and the third side surface and a second portion between the channel and the fourth side surface.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE EXEMPLARY EMBODIMENTS OF THE INVENTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom.

Figure 1A:
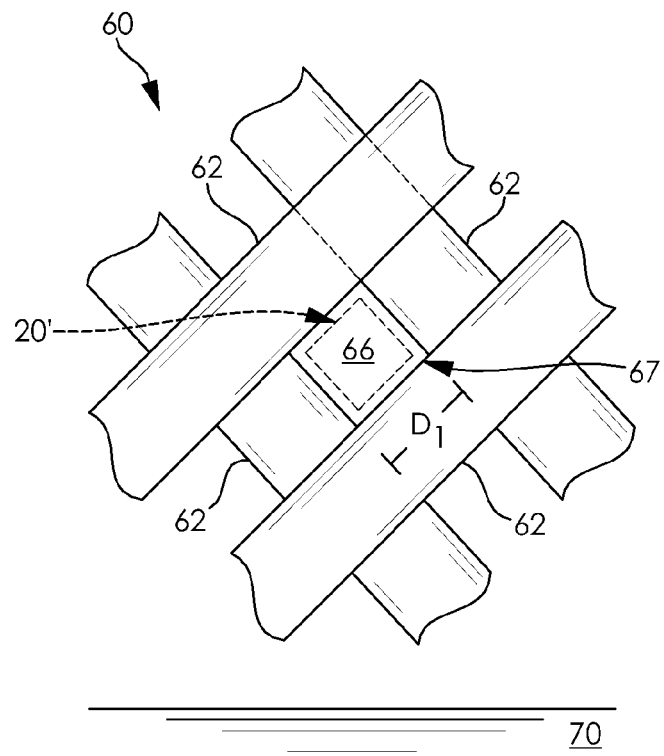
FIG. 1A is a fragmentary elevational view of a lattice fence arrangement.

FIG. 1A illustrates a lattice fence 60. The lattice fence 60 comprises a plurality of diagonally arranged and spaced apart elongate beams 62. The elongate beams 62 may be arranged with half of the elongate beams 62 arranged in parallel and angled 45° with respect to a ground surface 70 and the other half of the elongate beams 62 arranged in parallel and angled 135° with respect to the ground surface 70. The angled arrangement of the elongate beams 62 causes the lattice fence 60 to have a plurality of substantially square openings 66 formed between the intersecting elongate beams 62 with each side 67 of the square openings 66 being arranged at about 45° with respect to the ground surface 70. Each of the sides 67 of the square openings 66 has a side length $D_1$. The lattice fence 60 may be formed from two layers of the elongate beams 62 arranged transverse to each other, as shown by the broken lines in FIG. 1A, or from a single layer of material having the square openings 66 removed therefrom. In both cases, the lattice fence 60 has a width $W_1$ (as shown in FIG. 6C) extending from one major surface of the lattice fence 60 to an opposing major surface of the lattice fence 60. The lattice fence 60 may be formed from a thin layer of wood, but any material suitable for substantially permanent outdoor use could be utilized such as vinyl, for example.

Figure 1B:
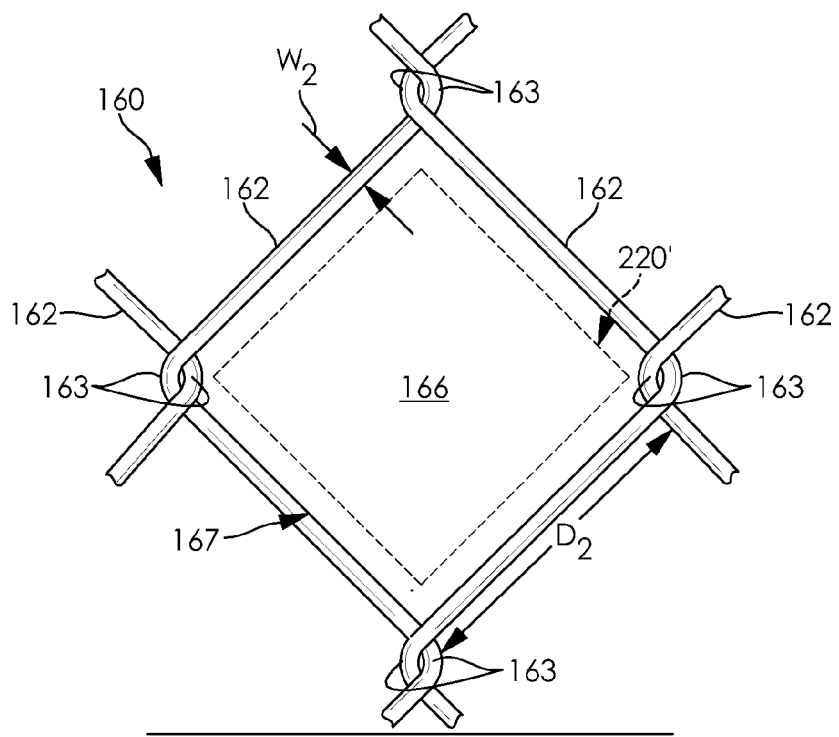
FIG. 1B is a fragmentary elevational view of a chain-link fence arrangement.

FIG. 1B shows a chain-link fence 160. The chain-link fence 160 comprises a plurality of spaced apart wires 162 extending vertically from the ground surface 70. Each of the wires 162 is formed to have an alternating pattern of zig-zag bends 163 formed therein as the wires 162 extend upwards. Each of the bends 163 of one of the wires 162 is hooked to a bend 163 formed in an adjacent one of the wires 162, causing the chain-link fence 160 to have a plurality of substantially square openings 166 formed between the wires 162, where the square openings 166 are arranged at about 45° with respect to the ground surface 70. Each side 167 of each of the square openings 166 has a side length $D_2$. The chain-link fence 160 may also have a width $W_2$ that is relatively small when compared to the side length $D_2$ due to the thinness of the wires 162.

Figure 2A:
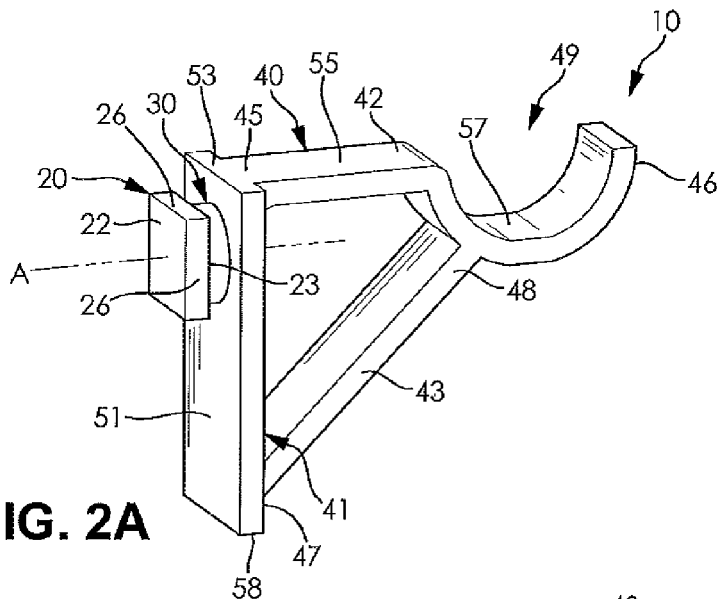
FIG. 2A is a perspective view of a hanging device for use with the lattice fence arrangement illustrated in FIG. 1A according to an embodiment of the invention.
Figure 2B:
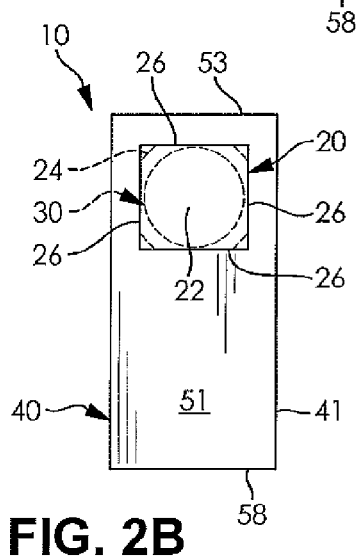
FIG. 2B is a rear elevational view of the hanging device illustrated in FIG. 2A.
Figure 2C:
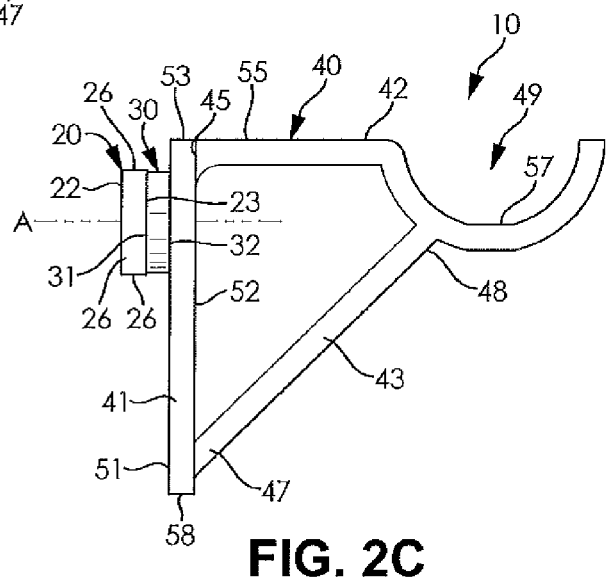
FIG. 2C is a side elevational view of the hanging device illustrated in FIG. 2A.

FIGS. 2A, 2B, and 2C illustrate a hanging device 10 for use with a latticed structure such as the lattice fence 60. The hanging device 10 comprises a retaining element 20, a shaft 30, and a hanger body 40. The hanger body 40 comprises a rear portion 41, a hanger portion 42, and a support portion 43. The hanging device 10 can be formed from any material capable of exposure to outdoor conditions, including wood, plastic, and corrosion resistant metals and metal alloys, for example.

The retaining element 20 has a substantially square cross-section adapted to be received in substantially square openings such as the square openings 66 formed in the lattice fence 60. The retaining element 20 includes a rear face 22, a front face 23 opposite the rear face 22, and four side surfaces 26 connecting the rear face 22 to the front face 23. Each of the rear face 22 and the front face 23 has a substantially square shape while each of the side surfaces 26 has a substantially rectangular shape. The rear face 22 and the front face 23 are arranged substantially parallel to each other while each of the side surfaces 26 are arranged substantially perpendicular to the rear face 22 and the front face 23. Each of the side surfaces 26 is formed to have a length slightly less than the side length $D_1$ of the square openings 66 of the lattice fence 60, allowing the retaining element 20 to be received in its entirety within the openings 66 of the lattice fence 60.

The retaining element 20 may also include chamfered corners 24 at each respective edge where adjacent side surfaces 26 of the retaining element 20 meet, as shown in broken lines in FIG. 2B. The chamfered corners 24 may aid the user in easily installing the retaining element 20 into the square openings 66, as the chamfered corners 24 allow a user to install the retaining element 20 even when the retaining element 20 may not be perfectly aligned with the square opening 66. The chamfered corners 24 may be formed to be flat surfaces substantially angled at 45° with respect to the two adjacent side surfaces 26 meeting at the chamfered corner 24, or the chamfered corners 24 may be formed as rounded corners with a radius, as desired. However, it should be understood that the chamfered corners 24 should not encroach on the side surfaces 26 to an extent that the chamfered corners 24 compromise the ability of the retaining element 20 to retain the hanging device 10 within one of the square openings 66 of the lattice fence 60.

The shaft 30 may be a substantially cylindrical connecting means having a first end 31 secured to the front face 23 of the retaining element 20 and a second end 32 secured to a rear surface 51 of the rear portion 41 of the hanger body 40, a longitudinal axis A of the shaft 30 extending from the first end 31 to the second end 32 thereof through a center of the shaft 30. The longitudinal axis A of the shaft 30 is substantially aligned with a center point on the front face 23 of the retaining element 20 to which it is secured, and the shaft 30 has a maximum diameter equal to or less than the length of each of the side surfaces 26 of the retaining element 20. Accordingly, the retaining element 20 extends laterally beyond a radial extent of the shaft 30 in any direction transverse to the longitudinal axis A of the shaft 30, creating a flange-like appearance to the retaining element 20 relative to the shaft 30. The shaft 30 is also dimensioned to have a length along its longitudinal axis A that is slightly greater than the width $W_1$ of the lattice fence 60. Although the shaft 30 is shown as having a circular cross-section, any cross-sectional shape may be utilized, including triangular, square, hexagonal, or octagonal shapes, as desired, so long as the shaft 30 does not extend laterally beyond an outer edge of the retaining element 20 and does not have a maximum diameter greater than the length of the side surfaces 26.

The hanger body 40 has a substantially rectangular rear portion 41 including a rear surface 51 and a front surface 52. The hanger portion 42 and the support portion 43 of the hanger body 40 each extend from the front surface 52 of the hanger body 40 in a direction opposite the direction the shaft 30 extends from the rear surface 51 of the hanger body 40.

The hanger portion 42 may include a first end 45 secured to the rear portion 41 of the hanger body 40 at or adjacent an upper surface 53 thereof while a second end 46 of the hanger portion 42 extends away from the rear portion 41. The hanger portion 42 may extend substantially perpendicular to the rear portion 41 of the hanger body 40 in a direction substantially parallel to the longitudinal axis A of the shaft 30. The hanger portion 42 may include a straight top surface 55 formed adjacent the first end 45 thereof while the second end 46 of the hanger portion 42 may include a hook feature 49 formed therein. The hook feature 49 may be a bent or arcuate portion of the hanger portion 42 forming a groove or channel 57 in an upper surface of the hanger portion 42. The groove 57 forming the hook feature 49 may have a substantially semi-circular profile. However, it should be understood that the groove 57 forming the hook feature 49 could have any profile suitable for retaining an article therein, including a substantially rectangular profile, for example.

The support portion 43 may include a first end 47 secured to the rear portion 41 at or adjacent a lower edge 58 thereof while a second end 48 of the support portion 43 extends away from the rear portion 41 and toward the second end 46 of the hanger portion 42. As shown in FIGS. 2A and 2C, the second end 48 of the support portion 43 may be coupled to the hook feature 49 formed in the hanger portion 42, but the support portion 43 may be coupled to the hanger portion 42 at any point along a length of the hanger portion 42, as desired. The support portion 43 may be angled with respect to both the hanger portion 42 and the rear portion 41 while extending diagonally therebetween to provide additional support to the hanger portion 42.

The coupling of the different components of the hanging device 10 may depend on the types of materials forming the hanging device 10 or the method of forming the hanging device 10. The shaft 30 may be secured to the retaining element 20 and the hanger body 40 by any form of fastening or connecting means, depending on the material from which the hanging device 10 is formed. For instance, if wood is used to form the hanging device 10, screws or nails or other fasteners may be used, or an appropriate bonding material, such as wood glue. If a metallic material is used, welding may be appropriate. Alternatively, the entire hanging device 10 may be formed by a casting or molding process, causing the retaining element 20, the shaft 30, and the hanger body 40 to be formed integrally in a single process. The retaining element 20 may also be rotatably coupled to the shaft 30 to allow the retaining element 20 to have different orientations relative to the shaft 30 and the hanger body 40, as explained hereinafter.

In use, the hanging device 10 is installed into the square opening 66 of the lattice fence 60 by orienting the retaining element 20 such that it is substantially aligned with the square opening 66, as shown by the broken lines 20' representing the retaining element 20 in FIG. 1A. The user then extends the retaining element 20 through the square opening 66 until the hanger body 40 abuts the lattice fence 60. Because the square opening 66 is oriented at 45° relative to the ground surface 70, the hanging device 10 is then turned approximately 45° until the top surface 55 of the hanging body 40 is substantially parallel to the ground surface 70. The hanging device 10 is now secured into place and the user can utilize the hanging device 10. When oriented in this manner, the shaft 30 rests on the elongate beams 62 of the lattice fence 60, while the retaining element 20 and the hanger body 40 are on opposite sides of the lattice fence 60, respectively. The hanging device 10 is held within the lattice fence 60 because the retaining element 20 cannot pass through the square opening 66 unless the user rotates the hanging device 10 45° to align the retaining element 20 with the square opening 66 once again. When installed, the hanging device 10 is ready for various articles to supported by the hook feature 49 or received in the groove 57. It should also be understood that the hanging device 10 may be used with a second adjacent hanging device 10, allowing an article to be supported between the two hanging devices 10. More hanging devices 10 can be used as desired.

In some cases, the user may desire to install the hanging device 10 in lattice fencing having the square openings 66 oriented substantially parallel to the ground surface 70 rather than being oriented 45° relative to the ground surface 70. In such cases, a hanging device 10 featuring a retaining element 20 that has been rotated 45° in either direction about the longitudinal axis A of the shaft 30 may be utilized. The retaining element 20 would accordingly be oriented at a 45° angle with respect to the top surface 55 of the hanger portion 42 of the hanger body 40. This alternative orientation of the retaining element 20 may be accomplished by securely attaching the retaining element 20 to the shaft 30 at this different orientation or alternatively by configuring the retaining element 20 to be rotatable about the shaft 30 between the possible desirable positions. If a rotatable retaining element 20 is utilized, the hanging device 10 would further be configured to secure the retaining element 20 to the shaft 30 once a desired angular position has been reached. For instance, the shaft 30 may include a female threaded shaft extending through its longitudinal axis A while the retaining element 20 would have a passage formed therethrough that substantially corresponds to an inner diameter of the female threaded shaft. A male threaded screw or bolt would then be inserted into the female threaded shaft and rotated until the retaining element 20 is secured to the shaft 30 at the desired angular position. Any other means of securing the retaining element 20 to the shaft 30 could also be utilized, as desired.

The hanging device 10 featuring the retaining element 20 oriented at a 45° angle relative to the top surface 55 of the hanger body 40 is installed using the same procedure described hereinabove. The retaining element 20 is oriented by the user to extend through and past the square opening 66 before rotating the hanging device 10 until the top surface 55 of the hanger portion 42 is parallel to the ground surface 70. The hanging device 10 is then securely installed as the retaining element 20 is oriented at a 45° angle with respect to the square opening 66.

Figure 3A:
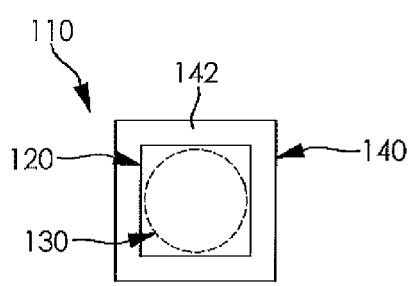
FIG. 3A is a rear elevational view of a hanging device for use with the lattice fence arrangement illustrated in FIG. 1A according to another embodiment of the invention.
Figure 3B:
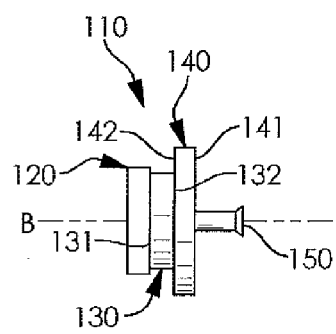
FIG. 3B is a side elevational view of the hanging device illustrated in FIG. 3A.

FIGS. 3A and 3B illustrate a hanging device 110 according to another embodiment of the invention. The hanging device 110 is similar to the hanging device 10 illustrated in FIGS. 2A, 2B, and 2C. The hanging device 110 may include a retaining element 120 and a shaft 130 having structure similar to the retaining element 20 and the shaft 30 of the hanging device 10. However, the hanger body 40 of the hanging device 10 has been replaced with a hanger body 140 suitable for hanging articles such as picture frames and the like therefrom. The hanger body 140 may include a front face 141 and an opposing rear face 142. Each of the front face 141 and the rear face 142 may have a rectangular or square shape, but it should be understood that any shape could be used so long as the front face 141 and the rear face 142 are at least as large as the retaining element 120, ensuring that the hanger body 140 does not pass through one of the square openings 66 formed in the lattice fence 60. The front and rear faces 141, 142 may be circular, hexagonal, or octagonal, for instance. The rear face 142 of the hanger body 140 may be coupled to a second end 132 of the shaft 130 opposite a first end 131 of the shaft 130 coupled to the retaining element 120. The retaining element 120, the shaft 130, and the hanger body 140 may all be formed in a row and concentric with each other, causing a longitudinal axis B of the shaft 130 to extend through a center of each component.

The hanging device 110 may further include a hanging feature 150 disposed on the front face 141 of the hanger body 140. The hanging feature 150 may be a projection extending away from the front face 141 of the hanger body 140. The projection may be a screw, nail, or a hook extending from the front face 141 adapted to have an article such as a picture frame hung therefrom, for example. In other embodiments, the hanging feature 150 may be a hook-and-loop feature, an adhesive, or any other known method of coupling an article to the hanger body 140. If the hanging feature 150 is in the form of a screw, nail-like structure, or hook, the hanging feature 150 may be inserted into an aperture formed in the front face 141 of the picture hanging body 140, where the aperture may have threads formed therein corresponding to threads formed on the hanging feature 150. Alternatively, the hanging feature 150 may be formed integrally with the remainder of the hanging device 110 during a molding process.

In use, the hanging device 110 is installed in similar fashion to the hanging device 10, including orienting the retaining element 120 to be inserted through one of the square openings 66 before then turning the hanging device 110. Once installed, the user may then hang an article, such as a picture, from the hanging feature 150 extending from the hanger body 140.

Figure 4A:
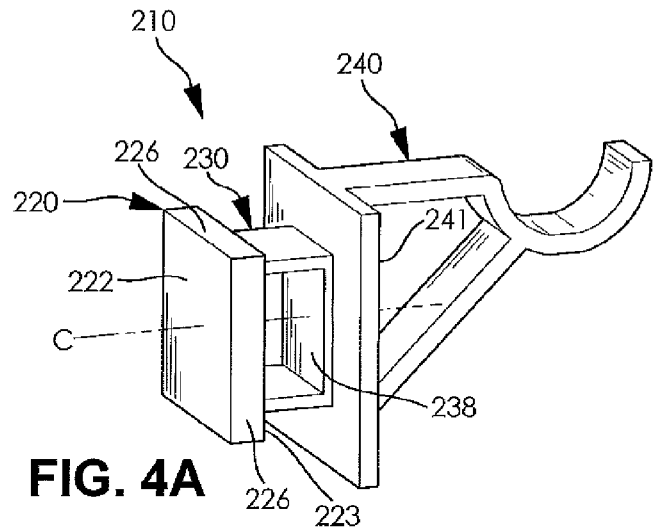
FIG. 4A is a perspective view of a hanging device for use with the chain-link fence arrangement illustrated in FIG. 1B according to another embodiment of the invention.
Figure 4B:
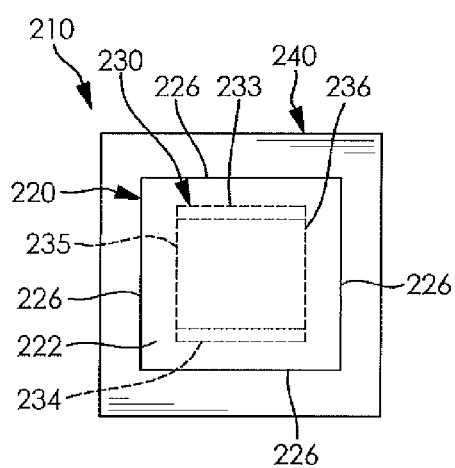
FIG. 4B is a rear elevational view of the hanging device illustrated in FIG. 4A.
Figure 4C:
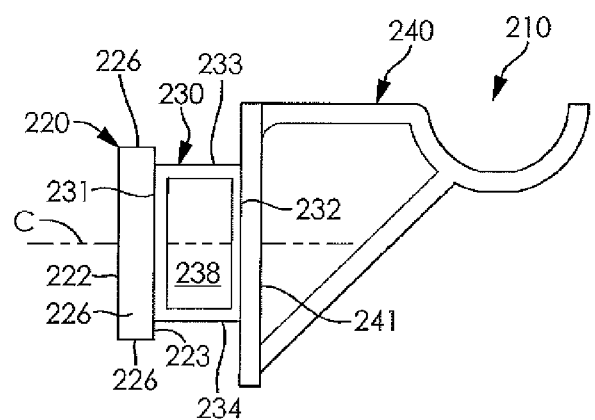
FIG. 4C is a side elevational view of the hanging device illustrated in FIG. 4A.

FIGS. 4A, 4B, and 4C illustrate a hanging device 210 according to another embodiment of the invention. The hanging device 210 is similar to the hanging device 10 except the hanging device 210 is adapted for use with a chain-link fence such as the chain-link fence 160. The hanging device 210 includes a retaining element 220 and a hanger body 240 having similar structure to the retaining element 20 and the hanger body 40 of the hanging device 10. The retaining element 220 includes a rear face 222 and a front face 223 having a substantially square shape. However, the hanging device 210 is dimensioned for use with the chain-link fence 160, hence the retaining element 220 includes side surfaces 226 having a length slightly smaller than the length $D_2$ of each side 167 of the square openings 166. The hanger body 240 may also be larger than the hanger body 40, and may also feature a rear portion 241 having a square shape instead of the rectangular shape of the rear portion 41 of the hanging device 10.

As shown in FIG. 4A, the hanging device 210 includes a shaft 230 having a different construction from the shaft 30 of the hanging device 10. The shaft 230 has a square or rectangular cross-section as it extends from the retaining element 220 at a first end 231 thereof to the hanger body 240 at a second end 232 thereof, causing the shaft 230 to include a top surface 233, a bottom surface 234, a first side surface 235, and a second side surface 236. A longitudinal axis C of the shaft 230 extends from the first end 231 thereof to the second end thereof 232 through a center of the shaft 230. The shaft 230 may include a channel 238 extending from the first side surface 235 to the second side surface 236, causing the shaft 230 to include a large hollow central portion. The channel 238 is shown as having a substantially square or rectangular cross-sectional shape similar to the side surfaces 235, 236, but the channel 238 could have any cross-sectional shape, as desired. The channel 238 causes the hanging device 230 to require less material to be formed, and also adds additional flexibility to the shaft 230.

In use, the hanging device 210 is installed in similar fashion to the hanging device 10, including orienting the retaining element 220 to be inserted through one of the square openings 166 formed in the chain-link fence 160 as shown by the broken line 220' in FIG. 1B. The hanging device 210 is then turned to cause the retaining element 220 to be unable to pass back through the square opening 166. Once installed, the user may then hang an article from the hanger body 240.

Figure 5A:
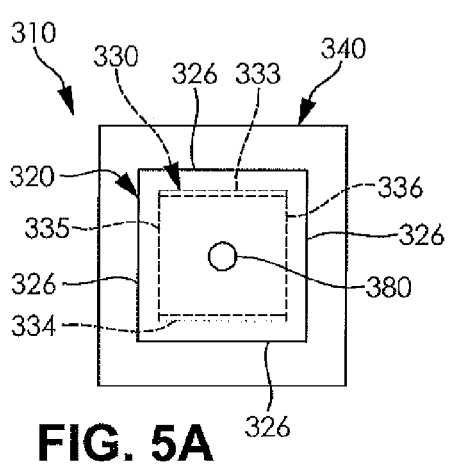
FIG. 5A is a rear elevational view of a hanging device for use with the chain-link fence arrangement illustrated in FIG. 1B according to another embodiment of the invention.
Figure 5B:
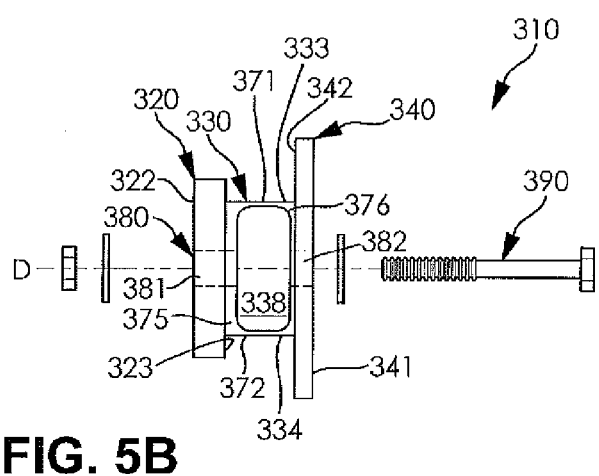
FIG. 5B is a side elevational view of the hanging device illustrated in FIG. 5A.

FIGS. 5A and 5B illustrate a hanging device 310 according to another embodiment of the invention that may be suitable for hanging articles such as signs therefrom. The hanging device 310 is adapted for use with a chain-link fence such as the chain-link fence 160, and includes a retaining device 320, a shaft 330, and a hanger body 340 all arranged concentrically. The retaining element 320 is similar in structure to the retaining element 220, including a substantially square rear face 322, a substantially square front face 323, and side surfaces 326 that are dimensioned to have a length slightly smaller than the side length $D_2$. The shaft 330 is similar in structure to the shaft 230 of the hanging device 210, including a channel 338 formed therein extending from a first side surface 335 to a second side surface 336 of the shaft 330. However, the channel 338 is formed to extend between the side surfaces 335, 336 in close proximity to a top surface 333 and a bottom surface 334 of the shaft 330, causing the shaft 330 to include a first thin portion 371 and a second thin portion 372. The first thin portion 371 and the second thin portion 372 may connect a first axial portion 375 of the shaft 330 coupled to the retaining element 320 to a second axial portion 376 of the shaft 330 coupled to the hanger body 340. Each of the first thin portion 371 and the second thin portion 372 are dimensioned to be thin enough to allow a material forming the shaft 330 to be flexible, causing the first and second thin portions 371, 372 to bow at least one of inwards in a direction toward the channel 338 and outwards in a direction away from the channel 338 when compressed in a direction of a longitudinal axis D of the hanging device 310 extending from the retaining element 320 to the hanger body 340. Each of the first thin portion 371 and the second thin portion 372 may have a width of less than 1/16 of an inch, a width of less than 1/32 of inch, or a width of less than 1/64 of an inch, for example. The first and second thin portions 371, 372 may also be resilient, causing the first and second thin portions 371, 372 to return to their normal configuration when a compressive load is no longer applied in the longitudinal direction of the hanging device 310.

The hanger body 340 of the hanging device 310 may include a front face 341 and an opposing rear face 342. Each of the front face 341 and the rear face 342 may have a rectangular or square shape, but it should be understood that any shape could be used so long as the front face 341 and the rear face 342 are at least as large as the retaining element 320, ensuring that the hanger body 340 does not pass through one of the square openings 166 formed in the chain-link fence 160. The faces 341, 342 may be circular, hexagonal, or octagonal, for instance. The rear face 342 of the hanger body 340 may be coupled to the shaft 330 opposite the retaining element 320.

Each of the retaining element 320, the shaft 330, and the hanger body 340 may include an aperture 380 extending from the front face 341 of the hanger body 340 through to the rear face 322 of the retaining element 320. The channel 338 may divide the aperture 380 into a first aperture 381 extending through the retaining element 320 and the first axial portion 375 of the shaft 330 and a second aperture 382 extending through the hanger body 340 and the second axial portion 376 of the shaft 330. The aperture 380 may be formed through the longitudinal axis D of the hanging device 310 including passing through a central region of the retaining element 320 and a central region of the hanger body 340, as desired. However, it should be understood that the aperture 380 may be formed through any portion of the hanger body 340, the shaft 330, and the retaining element 320, as the article being supported by the hanging device 310 may not be suited for being supported by a central region of the hanging device 310 due to a shape or arrangement of the article being supported.

The aperture 380 is adapted to receive a coupling device 390 therethrough. The coupling device 390 may be a bolt dimensioned to be received in the aperture 380, and the bolt may include a threaded end for receiving a corresponding threaded nut. The coupling device 390 may also be used in conjunction with a pair of washers to be disposed at each end thereof.

In other embodiments, the coupling device 390 may be a lag bolt having a threaded end adapted to penetrate the hanging device 310 at a desired location. For instance, the hanging device 310 may not have the aperture 380 formed therein, allowing a user of the hanging device 310 to select a location on the front face 341 of the hanger body 340 for inserting the lag bolt. In other instances, the hanging device 310 may include only the second aperture 382, causing the first axial portion 375 of the shaft 330 and the retaining element 320 to be devoid of the first aperture 381. In some embodiments, the hanging device 310 may include a plurality of the second apertures 382, allowing a user to select an aperture 382 for inserting the lag bolt depending on a desired arrangement of the coupling device 390. Still, in other instances, either of the first aperture 381 and the second aperture 382 may be formed to have a smaller diameter than that of the lag bolt, allowing the first aperture 381 and the second aperture 382 to act as a means for locating the threaded end of the lag bolt. Alternatively, the aperture 380 may include portions that have threading adapted to correspond to the threading formed on the lag bolt, including a threaded first aperture 381.

In all instances, the lag bolt is caused to penetrate or pass through the hanging device 310 through the hanger body 340 and the second axial portion 376 of the shaft 330 (via the second aperture 382 if included in the hanging device 310) until the lag bolt passes into and through the channel 338. Once the threaded end of the lag bolt encounters the first axial portion 375 of the shaft 330, a turning of the lag bolt will cause the threaded end of the lag bolt to further penetrate the first axial portion 375 and then the retaining element 320. If the first aperture 381 has threading corresponding to the threading on the lag bolt, the lag bolt is turned to continue inserting the lag bolt further into the first aperture 381 axially. Once a head of the lag bolt reaches the front face 341 of the hanger body 340, continued turning of the lag bolt will cause the hanger body 340 to be compressed toward the retaining element 320, causing the first thin portion 371 and the second thin portion 372 to flex.

Use of the lag bolt as the coupling device 390 may be advantageous as the user may select the location of the coupling device 390 relative to the article being supported by the coupling device 390. For instance, signage having predetermined holes or hanging means may be arranged relative to the hanging device 310 more easily due to the selection of the location of the coupling device 390 relative to the hanging device 310. Furthermore, use of the lag bolt eliminates the use of multiple components that may be lost or misplaced during installation of the hanging device 310. However, it should be understood that the coupling device 390 may be any known device capable of compressing the front face 341 of the hanger body 340 toward the rear face 322 of the retaining element 320, as desired.

In use, the retaining element 320 of the hanging device 310 is fed through a square opening 166 of the chain-link fence 160. Once the retaining element 320 has been pushed beyond the wires 162 forming the square opening 166, the hanging device 310 can be turned about 45° to secure the hanging device 310 within the chain-link fence 160. Once secured, a user of the hanging device 310 may then place the coupling device 390 through the aperture 380, or the user may utilize the coupling device 390 to penetrate the hanging device 310. The coupling device 390 may then be tightened to bring the retaining element 320 toward the hanger body 340. The tightening of the coupling device 390 may include tightening a nut onto a bolt fed through the aperture 380 or tightening a lag bolt that has penetrated the first axial portion 375 and the retaining element 320, for instance. The tightening of the coupling device 390 causes the thin upper portion 371 and the thin lower portion 372 to bow at least one of inwards or outwards while the hanger body 340 is moved closer to the retaining element 320. This causes the hanger body 340 and the retaining element 320 to be spaced very closely to to or clamp the wires 162 forming the chain-link fence 160 therebetween, further securing the hanging device 310 within the square opening 166 of the chain-link fence 160. Furthermore, if the first and second thin portions 371, 372 are configured to bow outwards, the outward bowing of the shaft 330 further secures the hanging device 310 in its position within the square opening 166 of the chain-link fence 160 if the first and second thin portions 371, 372 press against the wires 162 on an interior surface of the square opening 166. Once installed and tightened, an article may be hung from the coupling device 390. Alternatively, the coupling device 390 may be used to tighten an article between the front face 341 of the hanger body 340 and a laterally projecting portion of the coupling device 390, such as a bolt head, for instance.

Figure 6A:
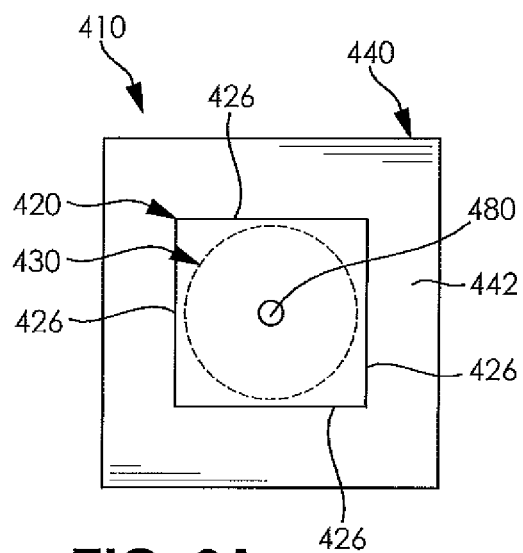
FIG. 6A is a rear elevational view of a hanging device for use with the lattice fence arrangement illustrated in FIG. 1A according to another embodiment of the invention.
Figure 6B:
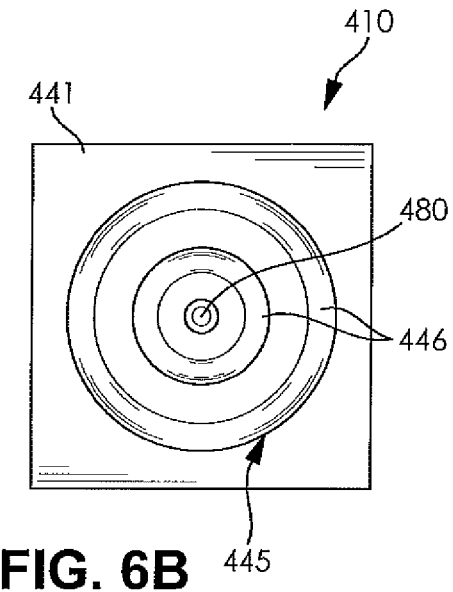
FIG. 6B is a front elevational view of the hanging device illustrated in FIG. 6A.
Figure 6C:
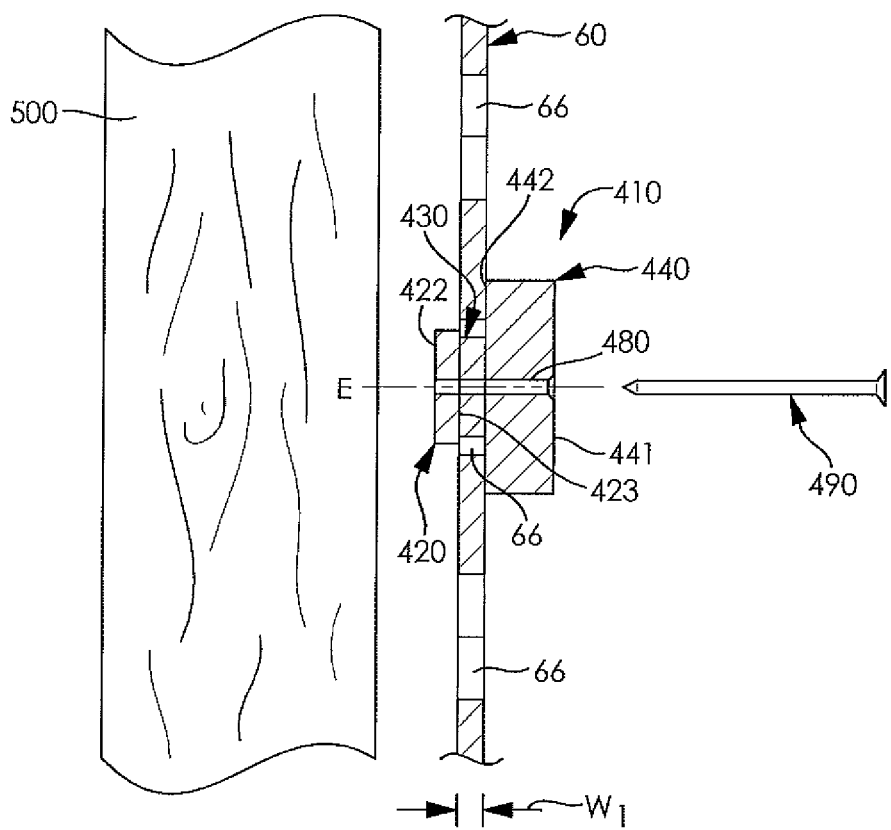
FIG. 6C is a fragmentary partially exploded side sectional view of the hanging device illustrated in FIG. 6A showing components for installation in a lattice fence arrangement for attachment to a substrate.

FIGS. 6A, 6B, and 6C illustrate a hanging device in the form of an anchor 410 according to yet another embodiment of the invention. The anchor 410 is for use with a lattice fence such as the lattice fence 60. The anchor 410 includes a retaining element 420, a shaft 430, and an anchor body 440 that are all arranged concentrically along a longitudinal axis E of the anchor 410. The anchor body 440 includes a front face 441 and a rear face 442. The front face 441 of the anchor body 440 may include a decorative feature 445 formed therein. As shown in FIG. 6B, the front face 441 may include at least one circular groove 446 formed therein as the decorative feature 445. The anchor body 440 is shown as having a substantially square front face 441 and a substantially square rear face 442. However, it should be understood that any shape of the anchor body 440 may be used without departing from the scope of the invention. The shaft 430 is similar to the shaft 30 of the hanging device 10. The shaft 430 may have an axial length that is slightly larger than or substantially equal to the width $W_1$ of the lattice fence 60. The shaft 430 may be cylindrical in shape, but any shape may be used so long as the shaft 430 does not extend laterally beyond the retaining element 420 or have a maximum diameter greater than that of the retaining element 420.

The retaining element 420 is similar to the retaining element 20 of the hanging device 10. The retaining element 420 includes a rear face 422, a front face 423 opposite the rear face 422, and four side surfaces 426 connecting the rear face 422 to the front face 423. Each of the rear face 422 and the front face 423 has a substantially square shape while each of the side surfaces 426 has a substantially rectangular shape. However, the retaining element 420 may differ from the retaining element 20 because the rear face 422 may be spaced apart from the front face 423 a different distance than a distance the rear face 22 is spaced apart from the front face 23 of the retaining element 20, causing the retaining element 420 to have a different axial length than the retaining element 20. The retaining element 420 may have the different axial length because the retaining element 420 also acts as a spacer when the anchor 410 is installed through one of the square openings 66 of the lattice fence 60. In some instances, a user of the anchor 410 may desire to have the lattice fence 60 spaced apart from a substrate to which the lattice fence 60 is to be attached to allow a device such as the hanging device 10 to be inserted between the substrate and the lattice fence 60. In such instances, the retaining element 420 may be selected to have an axial length greater than that of the retaining element 20, creating a clearance between the retaining element 20 and the substrate when the hanging device 10 is installed into the lattice fence 60. The retaining element 420 is shaped to fit within one of the square openings 66 of the lattice-fence 60, causing each side surface 426 of the substantially square retaining element 420 to have a length slightly smaller than the length $D_1$ of each side 67 of the square openings 66.

An aperture 480 may be formed through a center point of each of the retaining element 420, the shaft 430, and the anchor body 440. The aperture 480 extends throughout an axial length of the anchor 410. The aperture 480 may be adapted to receive a coupling device 490 therethrough. The coupling device 490 may be any known means of attaching a solid object to another substrate. For instance, the coupling device 490 could be a nail or lag bolt, for instance. In the case of a nail or lag bolt as the coupling device 490, it should be understood that the anchor 410 may not require the aperture 480 formed therethrough as the nail or lag bolt may create an aperture through the anchor 410 when the nail or screw is forced axially through the anchor 410, allowing a user of the anchor 410 to select a location of the aperture 480.

In use, the anchor 410 is used to attach a portion of a fence such as the lattice-fence 60 to a substrate 500. The substrate 500 may be a wooden post, for instance, as illustrated in FIG. 6C. The retaining element 420 of the anchor 410 is first aligned with one of the square openings 66 of the lattice fence 60 where the user wants the lattice-fence 60 to be attached to the substrate 500. The user then directs the retaining element 420 of the anchor 410 through the square opening 66 until the retaining element 420 has passed through the square opening 66 and the anchor body 440 is immediately adjacent a side of the lattice fence 60 opposite the retaining element 420. The user then turns the anchor 410 to cause the retaining element 420 to be unable to pass back through the square opening 66. Because the shaft 430 has an axial length slightly larger or substantially the same as the width $W_1$ of the lattice fence 60, the lattice fence 60 may be sandwiched between the retaining element 420 and the anchor body 440. The anchor 410 is then in a position to be coupled to the substrate 500.

The user then places the retaining element 420 of the anchor 410 adjacent a location on the substrate 500 where the user would like to couple the anchor to the substrate 500. The retaining element 420 acts as a spacer between the substrate 500 and the lattice fence 60, spacing the lattice fence 60 from the substrate 500 a distance equal to the axial length of the retaining element 420. The user may then insert the coupling device 490 through the aperture 480 and into the substrate 500. For instance, if screws or nails are used as the coupling device 490, the screw or nail should be selected to have a length capable of passing through the retaining element 420, the shaft 430, the anchor body 440, and at least a portion of the substrate 500. In other embodiments, the anchor 410 may not include the aperture 480, and the coupling device 490 may be applied directly through the anchor 410 and the substrate 500.

It should be understood that any portion of the hanging device 10, the hanging device 110, the hanging device 210, the hanging device 310, and the anchor 410 may be adapted for use with either of the lattice fence 60 or the chain-link fence 160 by properly dimensioning the retaining elements 20, 120, 220, 320, 420 and the shafts 30, 130, 230, 330, 430. Furthermore, it should be understood that any of the hanging devices 10, 110, 210, 310, 410 may be adapted to include a shaft similar to the shaft 230 included in the hanging device 210 or the shaft 330 included in the hanging device 310. For instance, the shaft 330 having the channel 338 and the first and second thin portions 371, 372 may be adapted for use with the hanging device 10 to allow the hanging device 10 to be compressed in similar fashion to the hanging device 310. In such cases, the rear portion 41 of the hanger body 40 and the retaining element 20 may also be adapted to include an aperture similar to the aperture 380 formed therethrough for receiving a coupling element 390 such as a nut and bolt, allowing the hanging device 10 to be compressed about each side of the lattice fence 60 when the hanging device 10 is installed in a square opening 66. It should also be understood that the hanger bodies 40, 140, 240, 340 and the anchor body 440 may be adapted for use with any of the features of the hanging devices 10, 110, 210, 310, 410. Similarly, the hanger bodies 40, 140, 240, 340, 440 may be interchangeable depending on a desired application and available fencing.

Furthermore, it should be understood that each of the hanging devices 10, 110, 210, 310, 410 may be formed integrally in a molding process to create a one-piece construction that is easily manufactured and requires the addition of few or no moving parts, greatly simplifying the hanging devices 10, 110, 210, 310, 410 over prior art solutions.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A system comprising:
   a structure having at least one square opening formed therein, wherein the at least one square opening is oriented at an oblique angle with respect to a ground surface; and
   a removable hanging device configured for use with the structure having the at least one square opening formed therein, the removable hanging device comprising:
   a retaining element configured to be received in the at least one square opening of the structure, the retaining element including a plurality of side surfaces, wherein a first pair of the side surfaces is formed opposite and parallel to each other, and a second pair of the side surfaces is formed opposite and parallel to each other, the first pair of side surfaces formed perpendicular to the second pair of side surfaces;

a hanger body configured to support an article; and a shaft connecting the retaining element to the hanger body, a longitudinal axis of the shaft extends through a center of the shaft and is substantially aligned with a center of the retaining element, wherein the retaining element of the removable hanging is received through the at least one square opening of the structure when the removable hanging device is oriented in a first position, and the removable hanging device is secured in the at least one square opening when the removable hanging device is oriented in a second position, wherein the second position is rotated by an oblique angle from the first position with respect to the longitudinal axis of the shaft.

2. The system according to claim 1, wherein each of the side surfaces of the retaining element is disposed radially outwardly from the axis of the shaft a distance greater than a distance than any portion of the shaft extends radially outwardly from the axis of the shaft.

3. The system according to claim 2, wherein the shaft is substantially cylindrical.

4. The system according to claim 2, wherein the retaining element is substantially square.

5. The system according to claim 2, wherein the retaining element includes a plurality of chamfered corners formed intermediate each of the side surfaces.

6. The system according to claim 2, wherein the hanging device includes only one shaft and only one retaining element.

7. The system according to claim 1, wherein at least a portion of the hanger body adjacent the shaft is disposed radially outwardly from the axis of the shaft a distance greater than or equal to a distance that any portion of the shaft extends radially outwardly from the axis of the shaft.

8. The system according to claim 1, further comprising a plurality of corners, each of the corners formed intermediate adjacent ones of the side surfaces, wherein the corners of the retaining element are configured to be received through the at least one square opening of the structure when the hanging device is in a first orientation, and wherein each of the corners of the retaining element is configured to engage the structure when the hanging device is in a second orientation to militate against removal of the hanging device, the second orientation being rotated 45 degrees from the first orientation about the longitudinal axis of the shaft.

* * * * *